May 5, 1942.   J. E. WATSON ET AL   2,281,610
DUST COLLECTOR
Filed Dec. 21, 1939   2 Sheets-Sheet 2
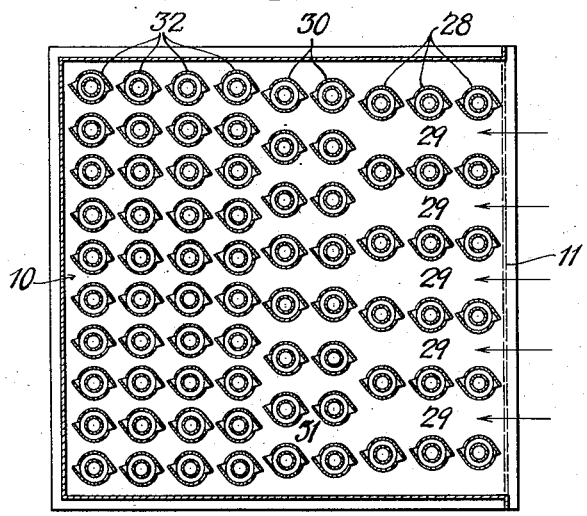
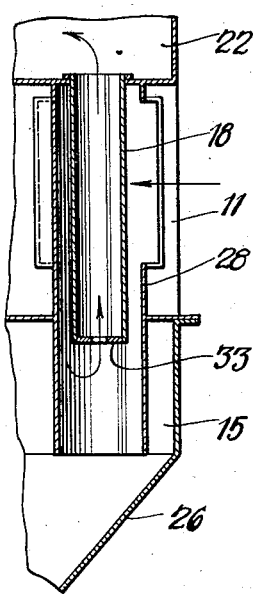
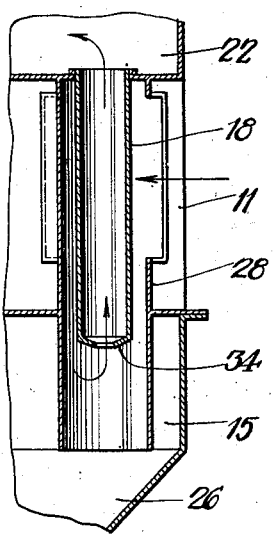
INVENTORS
JOHN E. WATSON.
BY CHARLES B. McBRIDE.
Benj. T. Rauber ATTORNEY.

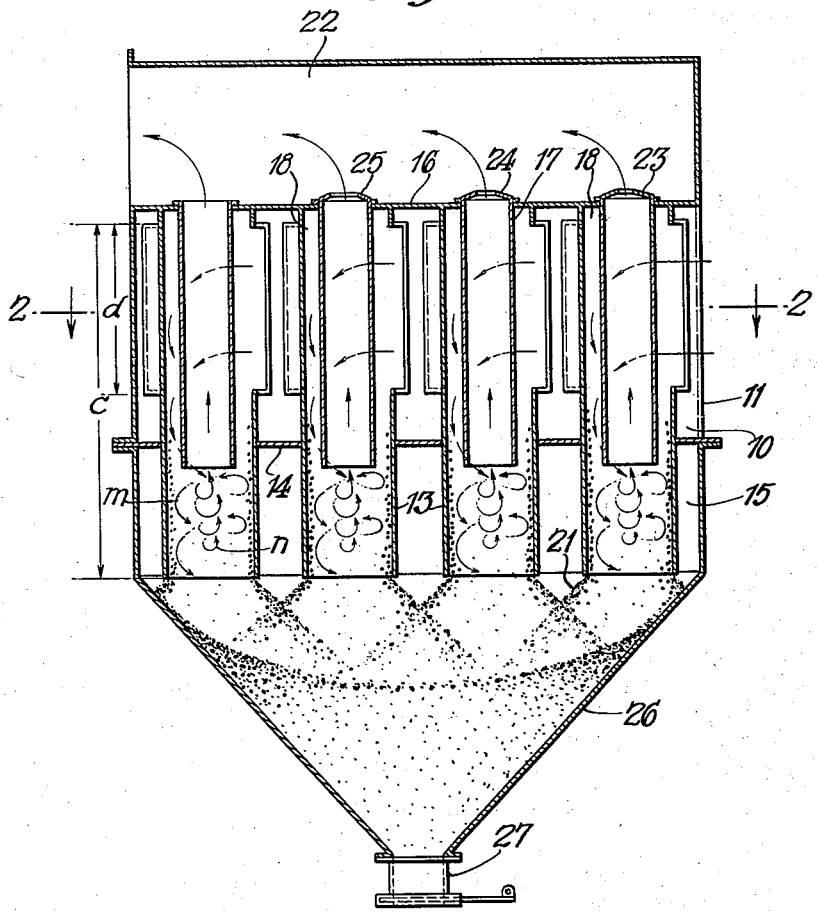
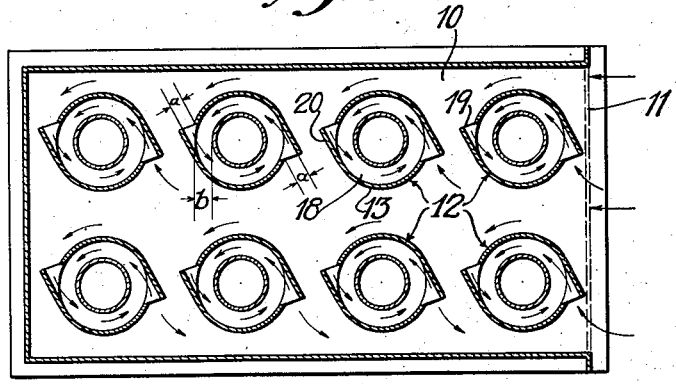

Patented May 5, 1942

2,281,610

UNITED STATES PATENT OFFICE 2,281,610

DUST COLLECTOR

John E. Watson, New Rochelle, and Charles B. McBride, Port Chester, N. Y., assignors to Prat-Daniel Corporation, Port Chester, N. Y., a corporation of New York Application December 21, 1939, Serial No. 310,352

5 Claims. (Cl. 183—83)

Our invention relates to improvements in multiple unit centrifugal dust collectors in which dust laden gases are divided into separate parallel streams and caused to pass in parallel through centrifugal dust separator units. The present application is a continuation in part of our application Ser. No. 277,611, filed June 6, 1939.

In dust collectors of the above type it is desirable for the efficient separation of dust from the gases, to give the dust laden gas as high a rotational speed as is possible within the centrifugal separating units in order to impart the maximum centrifugal force to the dust particles to be separated. As the dust laden gases are supplied under a limited pressure this requires that this pressure be transformed into velocity as efficiently as possible and with a minimum of obstruction. It is also desirable that after the dust particles have been separated from the carrying gases or air that the latter be drawn off at a substantially uniform rate and without setting up any currents in the spaces to which the separated dust particles are delivered that might again draw these particles into the air stream.

In our present invention the dust laden air or gases pass from a supply or plenum chamber into a number of cylindrical centrifugal separating units extending into the chamber and on entering the units the air or gas is given a maximum rotational velocity. To this end the units are provided with tangential openings, that is, with an opening in the angle formed between the cylindrical wall of the unit and a wall extending tangentially from the wall of the unit. Extending downwardly within each unit there is an axial or central outlet or take-off tube which forms the inner wall of an annular space in which the entering gases are received. The widths of the inlet openings for each unit are such that their aggregate width exceeds the radial dimension of the annular space between the outlet tube and the outer wall of the unit. In this way the air or gas enters each unit with a minimum of obstruction and with a minimum of change of direction, thus avoiding frictional and eddying losses.

The lower ends of the units deliver into a receiving or hopper chamber. The distance from the inlet openings to the lower end of the unit where it delivers into the hopper or receiving chamber is short, generally less than twice the longitudinal dimension of the inlet opening so that particles of dust still have a rotational speed and considerable centrifugal force as they reach the outlet and end and thus fly radially outwardly and away from the separated gas which then enters the lower end of the off-take tube and passes directly upwardly to be delivered above the plenum chamber either directly to the atmosphere or to an off-take conduit.

Uniform distribution of air or gases to the units is provided by controlling the flow to the units or groups of units. This may be accomplished by spacing the units to maintain uniform flow and pressure at the entrances to them or by providing means for the off-take tubes of each unit or certain of the units to control or restrict the flow therethrough. For example, such restriction may be placed on or in the off-take tubes of the units nearest the entrance to the plenum chamber and the restrictions may be progressively reduced at greater distances from the supply end. In this way a drop in pressure in the plenum chamber toward the farther units may be compensated by greater resistance in the off-take tubes of the nearest units and the flow through the units made uniform and equal.

The various features of our invention are illustrated by way of example in the accompanying drawings in which Fig. 1 is a vertical section of a dust collector embodying our invention, this view being taken through a series of vertical separating units and lengthwise of the apparatus.

Fig. 2 is a horizontal section of the apparatus taken on line 2—2 of Fig. 1.

Fig. 3 is a horizontal section of a modification showing a different arrangement of units, this section being taken on a plane corresponding to the lines 2—2 of Fig. 1.

Figs. 4 and 5 are vertical sections of modified units.

In the embodiment of the invention illustrated in Figs. 1 and 2, dust laden air or gas enters a supply or plenum chamber 10 through an opening 11, and is then divided and supplied to a number of dust separating units 12, eight being shown by way of example. The dust separating units each comprise a cylindrical tube 13 which extends through the bottom wall 14 of the plenum chamber 10 and opens into a hopper chamber or dust receiving chamber 15 positioned below the plenum or supply chamber 10. The upper end of the tubular unit is closed. In the example shown in Figs. 1 and 2 it is closed by the top wall 16 of the plenum chamber 10, but may be closed by an indepndent closure.

Within each tubular unit 13 there is an outlet or off-take tube 17 which extends through the wall 16 and projects downwardly into the tube 13 in axial position, and with its wall spaced from the tube 13 to form an annular passage 18. Upwardly extending openings or slots 19 admit air from the plenum chamber 10 into the annular passage 18 of the units. The openings 19 are tangential to the wall of the tubes 13, that is, they are formed with a straight or substantially straight wing or wall 20 tangential to the surface of the tube 13, so that air passing through the passage 19 along the wall 20 is given a circulatory or whirling movement through the annular passage 18 with a minimum change of direction. The walls 20, may be made by slitting the wall 13 and then bending the metal or material of the wall to a straight tangential position.

The dust laden air or gas supplied to the plenum chamber 10 thus divides and passes through the openings 19 into the annular passage 18 and is given a rapid rotary movement as it passes downwardly in the annular passage. Due to the centrifugal effect of the rapid circulatory movement, the particles suspended in the air or gas are thrown against the inner surfaces of the tube 13 while passing downwardly toward the lower end of the tube. The lower ends of the tubes terminate while these particles are rapidly moving in a circular direction and the particles are therefore thrown outwardly and clear of the tube walls, as indicated at 21 in Fig. 1. The air or gas thus freed of the suspended particles remains inwardly of the rotating particles and passes into the lower open ends of the off-take tubes 17 and then upwardly through these tubes to be discharged above the top wall 16 of the plenum chamber. They may discharge directly into the atmosphere or into a chamber 22 from which they may be supplied to any destination.

It will be understood, of course, that the air or gas may be supplied to the plenum chamber under super-atmospheric pressure, or that the purified gases may be withdrawn from the chamber 22 under sub-atmospheric pressure, and that the passage of the gases through the apparatus may be caused by pressure or suction or a combination of both.

In apparatus of the above type it is desirable to have the difference in pressure between the plenum chamber 10 and the off-take chamber 22 transformed into kinetic or velocity head as completely as possible and with a minimum loss of velocity so that the rotation of the air in the annular passage 18 may be a maximum and that a maximum centrifugal force may thus be generated to throw out as quickly as possible the suspended particles. For this purpose the air is admitted from the plenum chamber to the annular passages 18 directly through openings 19 which cause the air to move tangentially on to the inner surface of the tube 13, and moreover, the aggregate inlet area of the openings 19 is made greater than the area represented by the distance from the inner tube 17 to the outer tube 13 over the length of the inlet slot, so that air may be supplied at a maximum rate to the rapidly circulating air stream. For this purpose a number of openings may be provided for each unit.

In the example shown in the accompanying drawings, two such openings are provided arranged at diametrically opposite sides of the tube. These openings have a horizontal width or dimension $a$ and the relation of this width to the dimension $b$ of the passage 18 is such that $2^a$ equals or exceeds $b$. In the specific example shown in the drawings, $2^a$ would be approximately equal to $2^b$. Through the above relation and arrangement of openings the air enters the centrifugal tubes 13 uniformly and at high velocity, thus giving a very rapid and complete separation of suspended particles from the air or gases.

As the air or gas is delivered to the plenum chamber 10 from the right as shown in Fig. 1 and Fig. 2, and must pass between the units 12 in order to reach the last unit, there will be a progressive drop in pressure which may be considerable if the quantity of gases or the air supply is large. This might cause more air or gas to enter the units nearest the inlet end and thus throw the distribution of the gases out of their proper relationship or out of uniformity. In order to equalize the distribution of air or gas to the units, those units nearest the inlet end 11 may be provided with annular rings or caps 23, and those intermediate or between the first and the last units, may be similarly provided with annular caps 24 and 25. These caps close the openings from the outlet tubes to a greater or less extent, their size being exaggerated in the drawings to show a progressive graduation from the inlet end to the opposite end of the plenum chamber 10, or the tubes may be varied in size or otherwise restricted for the same purpose.

In this manner the frictional resistance of the air or gas from the outlet tubes 17 is adjusted to provide uniform air or gas distribution.

The tubes 13 are of tubular shape and of undiminished diameter to the lower discharge ends. Preferably they are relatively short as compared with the vertical dimensions of the openings 19. In the example shown, the vertical distance or dimension, indicated at $c$, from the bottom of the tube to the upper edge of the opening 19 is slightly more than twice the vertical dimension $d$ of the opening 19. Best results may be obtained when the dimension $c$ is not more than three times the dimension $d$, as in that case the particles still have considerable velocity and centrifugal force to hold then onto the wall 13 free from the purified air and to throw them into the hopper chamber in such a manner as to avoid any possibility of being drawn into the outlet tubes 17.

The length or vertical dimension $d$ of the opening 19 is much greater than its width or the dimension $a$. In the example shown, and in the embodiment of the invention used, the length $d$ is eleven times the dimension $a$. This provides for a much greater volume of entry of air or gas for a given width or radial dimension of the annular separating chamber and thus results in a much higher velocity of the rotating air or gases and a much more effective separation of suspended particles. The length of this lot should be not less than five times its width, and preferably greater than five times.

The hopper chamber 15 is preferably sufficiently large to receive the discharged particles and to permit them to settle quietly into a lower hopper shaped bottom portion 26 from which they may be withdrawn periodically through a discharge chute and valve 27. The desired plenum chamber effect may be had while maintaining a short distance from the bottom of the tubes to the bottom of the chamber by having the tubes 13 project for a considerable distance into the chamber 15.

Owing to the high velocity attained by reason of the free and large openings 10, the suspended particles are immediately thrown against the inner surface of the tubes 13 as indicated at $m$, Fig. 1, in an outer layer or whirl, whereas the cleaned gas passes in an inner whirl $n$ upwardly into the offtake pipe 17.

However, the partition 14 may be placed at the lower ends of the tubes 13, and the hopper chamber 26 be otherwise made large enough to give a plenum effect, or the partition may be placed only a short distance above the bottom edges of the tubes 13.

In the modification shown in Fig. 3 a larger number of units is illustrated and they are arranged in such a manner as to obtain an even distribution of the air or gases entering the units. For this purpose the units are arranged in rows.

In the particular modification illustrated by way of example, there are six rows of three units each near the entrance end of the supply or plenum chamber and these rows are spaced to provide relatively wide passageways 29 so that the entering air or gases may pass within a minimum of restriction and with substantially undiminished pressure or velocity through these rows to a succeeding series of rows 30. The rows 30 which in the instance shown consist of two units each are very closely spaced and there are eight of such rows. This leaves somewhat narrow passages 31 for the passage of the air or gas that has not been supplied to the units of the rows 28 or 30. This air or gas then is supplied to a final series of rows 32, ten in number, in the example shown in Fig. 3, and each consisting of four units. The spaces between these units are relatively narrow but the volume of gas or air passing to the units has been reduced by the passage of air to the units to the rows 28 and 30, and consequently less space is required for its passage. In this way the entering air or gas passes freely into the units or with a resistance between the first and the last units that is substantially negligible as compared with the resistance in passing through the units themselves. In this manner the uniform distribution of the air or gas is obtained.

In the modification shown in Figs. 4 and 5 the individual units are similar to those of Fig. 1 except that instead of having a restriction at the outlet end of the off-take tubes 17, a flat annular disk 33 is provided at the bottom of the off-take tube 18 in Fig. 4, whereas in Fig. 5 a conical annular plate 34 is provided at the bottom of the off-take tube 18. By modifying the openings through these restrictive annular plates or cones the passage of air or gases through the units may be controlled.

It will be observed that in the above construction the units are all inclosed within the entering gases and therefore there is no opportunity for loss of heat; also, if an opening should be formed in the tubes 13 by the abrasive action of the rapidly travelling separating particles, it would not result in an escape of gases or in leakage of air from the atmosphere, and thus there would be no escape of noxious gases or interference with the centrifugal motion of the gases within the units.

In the above paragraph the invention has been described as applied to dust carrying gases, but it will be understood that it may be applied to gases carrying any kind of suspended material that may be separated under centrifugal force from the gaseous medium.

In the embodiment shown, the centrifugal tubes have been shown approximately vertical. They may, however, be inclined in which case the upper parts of the hopper chamber may extend above the lowermost parts of the supply chamber. The centrifugal tubes extend upwardly sufficient to permit the separated particles to fall by gravity through the lower open end, and that the part of the hopper chamber into which each lower end of the centrifugal unit extends is sufficiently below that particular tube to permit the suspended particles to fall into the hopper chamber.

The whirl of gas or air toward the center of the tube has been substantially freed of its dust, and the whirl of gas or air near the inside periphery of the outer tube has a high dust concentration. Since the center whirl should be contaminated as little as possible from the concentrated dust contained in the outside whirl, the tube is made sufficiently short to allow this dust to project outwardly into the dust hopper while it is still subject to high centrifugal action, which would diminish if the tube is unduly lengthened. Thus the invention possesses many advantages due to the proper limitation in the length of the tube, provided this is combined with sufficient velocity due to the relatively large areas of the inlets so that high centrifugal force acts effectively in the relatively short time that the gas remains in the centrifugal tubes.

This offers considerable advantages over the customary manner of designing cyclone dust precipitators which generally have a cone at the bottom which draws the outside whirl inwardly together with its heavy dust charge, and thus in more intimate contact with the clean gas of the center whirl.

It will also be understood that the restrictions in the outlet tubes of the individual units may be used on certain units but not generally on all units of a collecting system, and that in some arrangements it is not necessary to use this controlling means on any of the units.

What we claim is:

1. A centrifugal separator unit which comprises a cylindrical tube open at one end and closed at the opposite end, an off-take tube extending through said closed end and axially into said tube, and terminating short of the open end thereof to form an annular passage near the closed end of said tube, said outer tube having a pair of tangential extensions and inlet openings in the angle within said tangential extensions at diametrically opposite sides of said tube, said inlet openings having an aggregate width greater than the distance between the outer tube and the off-take tube and having a length greater than approximately one-third of the distance from the open end of said tube to the farther ends of said openings, said outer tube having an unbroken wall between said inlet openings.

2. A centrifugal separator of the type described which comprises a supply chamber having an inlet opening at one end, a series of spaced centrifugal units extending from within said supply chamber through the bottom wall thereof, each of said units comprising a cylindrical outer tube opening below said supply chamber and an off-take tube extending downwardly thereinto and terminating in said tube and forming an annular passage within the upper part thereof, said off-take tube being open at its lower end, said outer cylindrical tube having a pair of tangential inlet openings to said annular passage and at diametrically opposite sides thereof and means to proportion the distribution of gases passing through said off-take tubes.

3. A centrifugal separator which comprises a straight walled cylindrical separator tube open at its lower end and closed at its upper end, an off-take tube extending downwardly into said tube to provide an annular passage between said off-take tube and said separator tube, said off-take tube being open at its lower end, said tube having an pair of longitudinally extending inlet openings arranged symmetrically about the circumference of said tube and opening into said annular pasage, the aggregate width of said openings being greater than the width of said annular passage, the longitudinal dimensions of said openings being between approximately 28% and 42% of the distance from the upper end of the opening to the lower end of its respective tube and the wall of said separator tube being unbroken between said inlet openings.

4. A centrifugal separator which comprises a supply chamber, a dust receiving chamber below said supply chamber, a number of cylindrical tubes extending from said supply chamber downwardly into and opening into said dust receiving chamber, off-take tubes one for each of said cylindrical tubes extending downwardly and axially into its respective cylindrical tube to form an annular passage therein, each of said cylindrical tubes having a pair of tangential openings into said annular passages and an unbroken wall surface between said openings, the aggregate width of said openings being greater than the radial distance from said off-take tube to said cylindrical tube and the longitudinal dimensions of said openings being between approximately 28% and 42% of the distance from the upper end of the opening to the lower end of its respective tube, said tubes being arranged in rows in said supply chamber to provide spaces between said rows for the passage of gases from one end of said supply chamber toward the other, the tubes in the rows nearer the entrance end of the supply chamber being fewer and spaced more widely to effect a uniform gas flow past said tubes.

5. A centrifugal separator which comprises a supply chamber having an opening for the supply of air or gases thereto, a dust receiving chamber below said supply chamber, a number of cylindrical outer tubes extending from said supply chamber into said dust receiving chamber, off-take tubes, one for each of said outer tubes, extending downwardly into said outer tubes and axially thereof to form an annular passage between said tubes, each of said cylindrical tubes having a pair of openings into said annular passages, said tubes being arranged in rows in said supply chamber transverse to the direction of gas flow in said supply chamber, the tubes being fewer and spaced more widely in the rows nearer the entrance opening than in tubes more remote from said opening, said inlet openings into the annular passages of said outer tubes having a dimension longitudinally of said tubes approximately ten times the width of said opening and the width of said opening being approximately equal to the radial distance between said inner and outer tube, the lengthwise dimension of said openings being between about 28% and 42% of the overall dimension from the upper end of said opening to the lower open end of said tube.

JOHN E. WATSON.
CHARLES B. McBRIDE.